United States Patent Office 3,257,302
Patented June 21, 1966

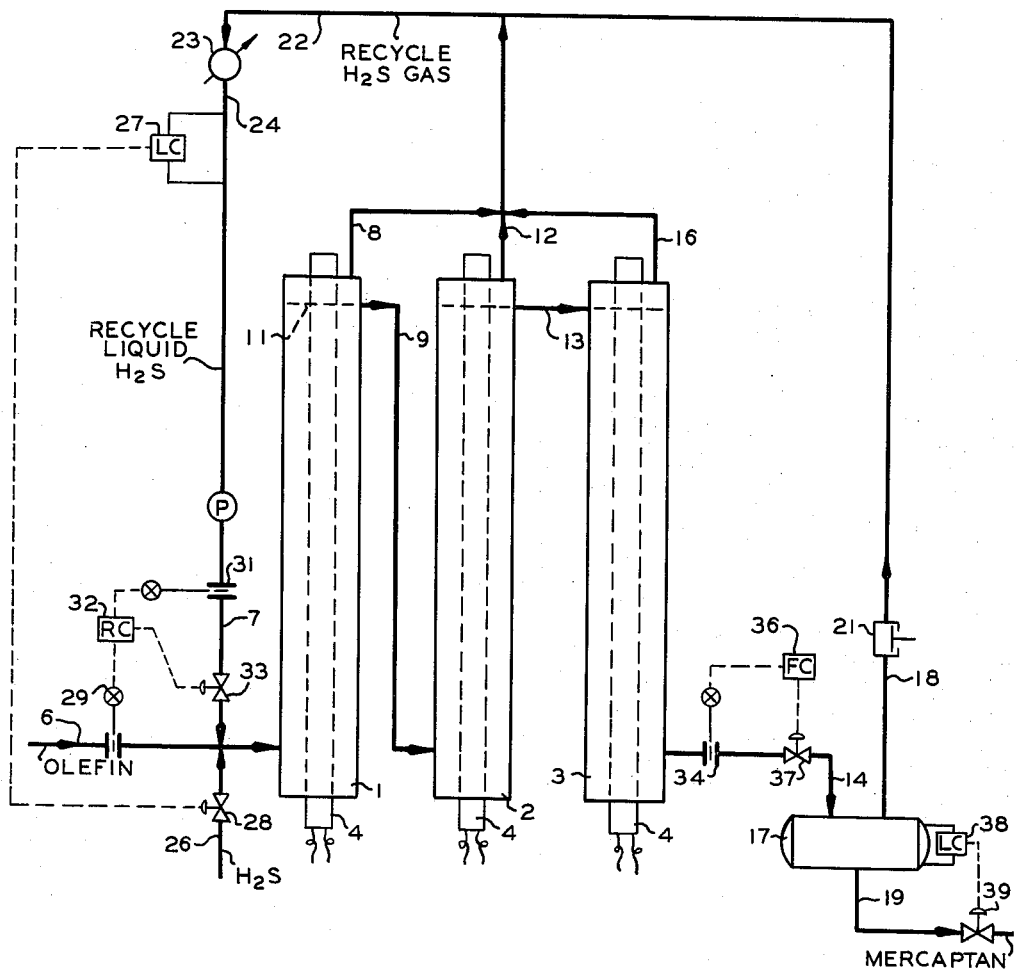

3,257,302
CONTINUOUS PROCESS FOR PREPARATION OF ORGANIC SULFUR COMPOUNDS
Paul F. Warner, Phillips, Tex., assignor to Phillips Petroleum Company, a corporation of Delaware
Filed June 28, 1962, Ser. No. 205,889
2 Claims. (Cl. 204—162)

This invention relates to a continuous process for the preparation of organic sulfur compounds. In another aspect, it relates to a continuous process for producing organic sulfur compounds, such as mercaptans and/or thioethers, from hydrogen sulfide and ethylenically unsaturated compounds in the presence of ultraviolet radiation.

Organic sulfur compounds are of considerable industrial importance and processes for obtaining them economically from readily available chemicals are of considerable utility. The particular process that is the concern of the subject invention is that wherein sulfur compounds such as mercaptans and/or thioethers (sulfides) are produced by reacting hydrogen sulfide with organic compounds containing ethylenic linkages in the presence of ultraviolet radiation, this general process being well known and of considerable importance in the field of sulfur chemistry.

In order to obtain fast reaction rates and a minimum of undesirable by-products, such as high boiling polymers and certain sulfides, it is necessary to use high mole ratios of hydrogen sulfide to ethylenically unsaturated compound. However, this process generally has been carried out heretofore in a batch type operation, which operation is not as economical as desired. Such an operation results in production of a reaction effluent having a high concentration of hydrogen sulfide, the separation and recovery of which is expensive and time consuming.

Accordingly, an object of this invention is to provide an improved process for the preparation of organic sulfur compounds. Another object is to provide a continuous process for the production of organic sulfur compounds, such as mercaptans and/or thioethers, by the reaction of hydrogen sulfide with ethylenically unsaturated compounds in the presence of ultraviolet radiation. Another object is to provide an improved process for the production of such organic sulfur compounds while maintaining a high mole ratio of hydrogen sulfide to ethylenically unsaturated compound, and production of a reaction effluent having only a minor amount of hydrogen sulfide. Other objects and advantages of this invention will become apparent to those skilled in the art from the following description, appended claims, and accompanying drawing in which the single figure illustrates a flow sheet of one embodiment of the improved process of this invention.

According to this invention, a continuous process is provided for the production of organic sulfur compounds, wherein reaction between liquid hydrogen sulfide and one or more ethylenically unsaturated compounds is carried out in a series of reactors, the reaction mixture in at least the first of such reactors being carried out in the presence of ultraviolet radiation, and the concentration of hydrogen sulfide in the reaction mixture being progressively decreased through the series of reactors. The reaction mixture in the several reactors is vigorously boiled by progressively increasing the reaction temperature and removing gaseous hydrogen sulfide from the top of each reactor. The residual amount of hydrogen sulfide left in the reaction effluent from the series of reactors can be removed by a simple flashing operation with only a minimum compression requirement being necessary to recompress the small amount of unreacted hydrogen sulfide for return to the system. The recompressed hydrogen sulfide can then be recycled together with the hydrogen sulfide removed from the tops of each of the reactors and reliquified, and the liquid hydrogen sulfide recycled to the first and/or one or more of the downstream reactors in the series. The liquid product obtained from the flashing operation can then be fractionated or otherwise separated to recover the valuable sulfur compounds.

Further understanding of the subject invention may be gained by the following description of the accompanying drawing, which illustrates one embodiment of the continuous process for the production of the sulfur compounds according to this invention.

In the drawing, a plurality of reactors 1, 2 and 3 are illustrated, connected in series; liquid reactants are fed to the first reactor 1 and the liquid reaction mixture from each reactor passed to the next reactor in the series. Each of reactors 1, 2 and 3 are shown provided with a source 4 of ultraviolet radiation, for example a mercury arc lamp. Such source 4 is preferably disposed within each reactor, as shown, though the source may be disposed outside of the reactor and the reactor made transparent in whole or part to the ultraviolet radiation and material such as Pyrex, Vycor and quartz may be used for this purpose. Such sources of ultraviolet radiation are conventional and need not be described in detail. The number of reactors used can vary and will be at least two reactors in series, with at least the first reactor in the series being provided with an ultraviolet radiation source. Such reactors can comprise vertical cylindrical shells provided with suitable openings for the introduction and withdrawal of fluids.

Supply line 6 supplies the ethylenically unsaturated compound, which is liquid under the operating conditions of the process, to the first reactor 1 in the series, this feedstock preferably being introduced into the lower end of the reactor. Liquid hydrogen sulfide is supplied to the first reactor by a supply line 7, and it is preferably mixed with the feedstock in line 6. The reactants introduced into the first reactor 1 react in an exothermic fashion. The heat of reaction (and/or heat supplied by supplemental heating means) cause the liquid hydrogen sulfide to vaporize to a great extent, causing violent agitation or boiling of the reaction mixture. The bulk or major part, i.e. at least 50 percent, of the reaction takes place in the first reactor. Vaporized hydrogen sulfide is withdrawn from the top of reactor 1 by overhead line 8 and liquid reaction mixture is withdrawn from reactor 1 by line 9, which is preferably disposed near the top of the reactor at the locus of liquid level 11. The withdrawn liquid reaction mixture in line 9, comprising unreacted reactants and product, is then introduced into the second reactor 2 in the series, again preferably near the lower end of the reactor. In the second reactor 2, further reaction takes place at a higher temperature level (which can be maintained by suitable heating means), the liquid hydrogen sulfide again causing violent agitation within the reactor and the evolved hydrogen sulfide gas being withdrawn via overhead line 12. The liquid reaction mixture from the second reactor 2 is then passed to the third reactor 3, and since the latter is the last reactor, the reaction mixture is preferably introduced into the upper end thereof via line 13 since the reaction effluent from this last reactor is withdrawn via line 14 from the lower end thereof. Further reaction takes place in this last reactor 3 at a high temperature level such that substantially all of the unreacted hydrogen sulfide left in the reaction mixture is vaporized and withdrawn overhead via line 16. The liquid reaction effluent in line 14 can then be passed to suitable recovery equipment for the separation of hydrogen sulfide and unreacted ethylenically unsaturated compounds from the product. For example, the reaction effluent 14 is passed to a flash drum 17, operated at lower pressures, so as to flash off from the reaction effluent a small residual amount of hydrogen sulfide, the latter being withdrawn from the flash tank via line 18. The liquid portion of the reaction effluent is then withdrawn via line 19 and passed to suitable separation equipment, such as a distillation column, for the separation of the organic sulfur product from any byproducts that may have been formed and unreacted ethylenically unsaturated compound.

The vaporized hydrogen sulfide, withdrawn from the tops of the reactors, can be combined, along with the flashed hydrogen sulfide from line 18 (after it is compressed by compressor 21) and passed via line 22 to suitable liquification means, such as a cooler 23. The reliquified hydrogen sulfide is then recycled via lines 24 and 7 to the first reactor in the series of reactors, as shown. Makeup liquid hydrogen sulfide can be added via line 26 to the feedstock in line 6. Alternatively, makeup liquid hydrogen sulfide and/or recycle liquid hydrogen sulfide can be added to one or more of the downstream reactors.

The process illustrated in the drawing can be provided with suitable control instrumentation to insure a proper mole ratio of hydrogen sulfide to ethylenically unsaturated compound. For example, where the recycle liquid hydrogen sulfide source is elevated as shown, line 24 can be provided with a liquid level controller 27 to manipulate flow control valve 28 in makeup hydrogen sulfide supply line 26. The flow rates in the feedstock line 6 and recycle hydrogen sulfide line 7 can be detected by conventional flow detecting devices, 29, 31, respectively, and the ratio of these flows measured by a flow rate ratio controller 32, which manipulates flow control valve 33 in recycle line 7 when the measured ratio varies from the desired value supplied by the setpoint of ratio controller 32.

The flow rate of the reaction effluent withdrawn from the last reactor 3 via line 14 can be controlled in a conventional manner by a control assembly comprising flow measurement device 34, flow rate controller 36 and flow control valve 37. Withdrawal of liquid product from flash unit 17 can be controlled conventionally by liquid level controller 38 and flow control valve 39.

In this continuous process, the mole ratio of hydrogen sulfide to ethylenically unsaturated compound is maintained above 1/1, and can be as high as 20/1. Notwithstanding the high concentration of hydrogen sulfide in this continuous process, the reaction effluent withdrawn from the last reactor will have a small or residual amount of hydrogen sulfide, thus simplifying the finishing of the final product. Only a small compressor requirement is necessary to recompress the residual hydrogen sulfide for its return to the system. The progressively increasing temperatures through the series of reactors gradually diminishes the concentration of hydrogen sulfide, while yet maintaining its high concentration in the upstream end of the series of reactors where the bulk of the reaction occurs. The reaction temperature can vary over a wide range, for example —50 to 300° F., with the temperature gradient through the series of reactors being maintained by feed rates and withdrawal rates and/or the use of suitable cooling and/or heating means, for example, cooling coils disposed within the reaction mixture or disposed in a jacket surrounding the reaction vessels. Of course, the pressure in the series of reactors also progressively decreases, and this may be maintained at suitable operating levels to insure withdrawal of substantially all of the unreacted hydrogen sulfide from the reaction mixture before withdrawal of the latter from the last reactor. Also, because of the progressively lower pressure through the series of reactors, the residence time of the reaction mixture will progressively increase through the series of reactors.

Although the reaction described herein can be carried out by using the whole range of ultraviolet radiations, i.e., wavelengths in the range of 100 to 3800 angstrom units, ultraviolet radiations having wavelengths below about 2900 angstrom units are preferred. The amount of radiation can vary over a wide range and will be dependent upon many factors, such as the particular unsaturated compound used as a reactant and the amount thereof, the source of radiation, and other considerations. Generally, however, the rate of ultraviolet radiation, expressed in terms of REP (roentgen equivalent physical) per hour will be in the range between $1 \times 10^3$ to $1 \times 10^{10}$, and the total radiation or dosage will generally be in the range between $1 \times 10^5$ and $1-10^{11}$ REP.

The ethylenically unsaturated compounds which may be reacted with hydrogen sulfide according to this invention include those with one or more ethylenic linkages, although those generally applicable will have a total of from 2 to 20 atoms per molecule and 1 to 3 ethylenic linkages. Such unsaturated compounds include acyclic and cyclic olefins, and the like. Representative unsaturated compounds useful in the practice of this invention include ethylene, propylene, butene-1, butene-2, isobutene, pentene-1, pentene-2, hexene-1, heptene-1, octene-1, decene-1, dodecene-1, pentadecene-1, heptadecene-1, eicosene-1, isopentene-1, 4-methyl-1-pentene, 3,6-dimethyl-1-heptene, 7-methyl-4-nonene, 4-methyl-5-butyl-4-decene, 1,4 - diphenyl-2-butene, 3-cyclohexyl-6-eicosene, 4,4-dimethyl-1-pentene, 4-methyl-2-pentene, 2,4,4-trimethyl-2-pentene, cyclopentene, 3-ethylcyclopentene, 2,5-diethylcyclopentene, cyclohexene, 3-ethylcyclohexene, 2-ethyl-4-methyl-5-heptyl-6-butylcyclohexene, cycloheptene, cyclooctene, 4-vinylcyclohexene, 3-ethyl-5-vinylcyclohexene, 4 - (1 - cyclohexenyl) butene-1, 4-vinylcyclopentene, 1-methyl-2-dodecyl-4-vinylcyclopentene, 1,5,9-cyclododecatriene, and the like.

In addition to the above-named unsaturated hydrocarbons, the process of the invention can be employed to effect an increased rate of reaction of hydrogen sulfide with ethylenically unsaturated compounds containing nonhydrocarbon groups. For example, the above named ethylenically unsaturated hydrocarbons can be substituted by such groups as halogens, particularly chlorine and bromine, hydroxyl, alkoxy, carboxy, carboalkoxy, alkenoxy, aralkoxy, and the like. Some specific examples of compounds of this type are vinyl chloride, vinyl bromide, allyl chloride, dodecenyl chloride, 2-chloroeicosene-2, allyl alcohol, cyclohexenyl alcohol, octenyl alcohol, 2 - butene - 1,4 - diol, 4-hydroxydodecene-2, 6-hydroxyeicosene, 7-hydroxy-1,4-octadiene, 4-ethoxy-pentene-2, 3-pentoxycyclohexene, methyl vinyl ether, divinyl ether, benzyl allyl ether, benzyl eicosenyl ether, 2-butenyl phenylethyl ether, acrylic acid, ethyl acrylate, methyl methacrylate, maleic acid, linoleic acid, linolemic acid, oleic acid, and the like.

A particularly useful class of ethylenically unsaturated compounds which can be employed in the process of this invention is that of doubly unsaturated terpene compounds, which can be reacted with hydrogen sulfide to produce cyclic dimercaptans. These doubly unsaturated cyclic terpene reactants will generally have at least 10 carbon atoms per molecule and include both cyclic and unsymmetrical bicyclic terpenes or mixtures thereof. Representative examples of suitable cyclic terpene compounds that can be employed according to the invention include dipentene (dl-limonene or $1,\Delta^{8-9}$-menthadiene), alpha-terpinene, gamma-terpinene, alpha phellandrene, beta-phellandrene, terpinolene, $3,\Delta^{8-9}$-methadiene, sylvestrene (derivative of methmenthane), cadinene (bicyclic sesquiterpene), alpha-selinene (bicyclic sesquiterpene), $\Delta^{1-7}$-3-menthadiene (beta.terpinene), $\Delta^{1-7}, \Delta^{8-9}$-menthadiene, and the like.

It is also within the scope of this invention to employ suitable diluents or solvents which are inert with respect to the reactants and conditions of reaction. For example, the ethylenically unsaturated compound can be dissolved in benzene, toluene, butanol, gasoline, etc.

Typical and representative of the various mercaptans and/or thioethers which can be produced according to this invention include ethyl mercaptan, propyl mercaptan, cyclohexyl mercaptan, diethyl thioether, dipropyl thioether, dicyclohexyl thioether, butyl mercaptan, dibutyl thioether, dodecyl mercaptan, dipentadecyl sulfide, eicosyl mercaptan, 4-methyl-n-pentyl mercaptan, cyclooctyl mercaptan, 1,5,9-trimercaptocyclododecatriene, 3-chloropropyl mercaptan, 2-bromoethyl mercaptan, 2-mercaptobutane-1,4-diol, 3-mercaptopropionic acid, thioglycollic acid, ethyl 3-mercaptopropionate, 2-mercaptobutane-1,4-dioic acid, bis(2-mercaptoethyl) ether, 2-mercaptoethyl benzyl ether, and the like.

The following examples further illustrate the objects and advantages of this invention, but it should be understood that the various reactants, amounts, temperatures, pressures, and other conditions recited in this example should not be construed so as to unduly limit this invention.

Referring to the drawing, a feedstock comprising liquid dipentene is fed through line 6 to reactor 1. The dipentene feed is mixed with liquid hydrogen sulfide supplied via lines 24, 7 to provide a reaction mixture having a mole ratio of hydrogen sulfide to dipentene of 9/1. This reaction mixture is subjected to ultraviolet radiation in reactor 1, the reaction being carried out at 80° F. and at a pressure equal to the vapor pressure of the hydrogen sulfide at this temperature. The heat of reaction in the reactor causes vigorous boiling due to the evolution of hydrogen sulfide gas which is withdrawn overhead via line 8. The major part of the reaction between the reactants occurs in reactor 1, i.e., at least 50 percent of the stoichiometric amount of the dipentene is converted. The reaction mixture withdrawn from reactor 1 via line 9, and having a mole ratio of hydrogen sulfide to dipentene of 5/1, is further reacted in reactor 2 in the presence of ultraviolet radiation at a temperature of 150° F. Again, evolved hydrogen sulfide is withdrawn via line 12 and the remaining reaction mixture having a mole ratio of hydrogen sulfide to dipentene of about 3/1, is passed via line 13 to reactor 3 to further carry out the reaction. In reactor 3, the reaction is maintained at 250° F. and the bulk of the hydrogen sulfide remaining in the reaction mixture is withdrawn overhead via line 16. Liquid reaction effluent is withdrawn from the bottom of reactor 3 and passed via line 14 to flash drum 17 operated at atmospheric pressure. The residual amount of hydrogen sulfide is thus separated and passed by line 18, recompressed by compressor 21 and recycled to the process along with the evolved hydrogen sulfide gases withdrawn from the tops of the reactors. Analysis of the liquid reaction effluent obtained via line 19 show it to have a mercaptan sulfur value of 18.4, which corresponds to 88 mole percent dimercaptan, calculated on the basis of 65 percent reaction material in the feed stock. Distillation of the liquid product indicates that it contains 95 mole percent of 2,9-para-menthane dithiol.

Various modifications and alterations of this invention will become apparent to those skilled in the art from the foregoing discussion and accompanying drawing, and it should be understood that this invention is not to be limited to that set forth herein for illustrative purposes.

I claim:

1. A continuous process for the production of an organic sulfur compound, which comprises passing liquid hydrogen sulfide and a liquid ethylenically unsaturated compound to the first of a plurality of reaction zones connected in series; subjecting a liquid reaction mixture consisting of the liquid hydrogen sulfide and the liquid ethylenically unsaturated compound in at least the first of said reaction zones to ultraviolet radiation; withdrawing gaseous hydrogen sulfide from the top of said first reaction zone; passing the liquid reaction mixture from said first reaction zone to a second reaction zone in series therewith; simultaneously increasing the temperature and withdrawing gaseous hydrogen sulfide from said second reaction zone; withdrawing liquid reaction mixture from said second reaction zone and passing it through at least one other reaction zone in series therewith; simultaneously increasing the temperature in said one other reaction zone and withdrawing gaseous hydrogen sulfide from said one other reaction zone; withdrawing reaction effluent having a low concentration of hydrogen sulfide from said one other reaction zone; recovering siad organic sulfur compound from said reaction effluent; liquefying said gaseous hydrogen sulfide and recycling the resulting hydrogen sulfide to the process.

2. The process according to claim 1, wherein said ethylenically unsaturated compound is dipentene and said organic sulfur compound is 2,9-paramenthane dithiol.

References Cited by the Examiner

UNITED STATES PATENTS

| 2,376,675 | 5/1945 | Evans et al. | 204—163 |
|-----------|--------|--------------|---------|
| 2,398,481 | 4/1946 | Vaughan et al. | 204—163 |
| 2,810,688 | 10/1957 | Ivins et al. | 204—163 |
| 2,906,681 | 9/1959 | Passler | 204—163 |
| 2,997,508 | 8/1961 | Stretton et al. | 204—163 X |
| 3,050,452 | 8/1962 | Louthan | 204—162 |

JOHN H. MACK, *Primary Examiner.*

JOHN R. SPECK, *Examiner.*

H. S. WILLIAMS, *Assistant Examiner.*